Dec. 6, 1932.  W. E. ROSEBUSH  1,890,413
LOG LOADING APPARATUS
Filed Aug. 15, 1931  3 Sheets-Sheet 1

WITNESSES
Jos. R. Lamia
Chris Feinle

INVENTOR
Waldo E. Rosebush
BY
Munn & Co.
ATTORNEYS

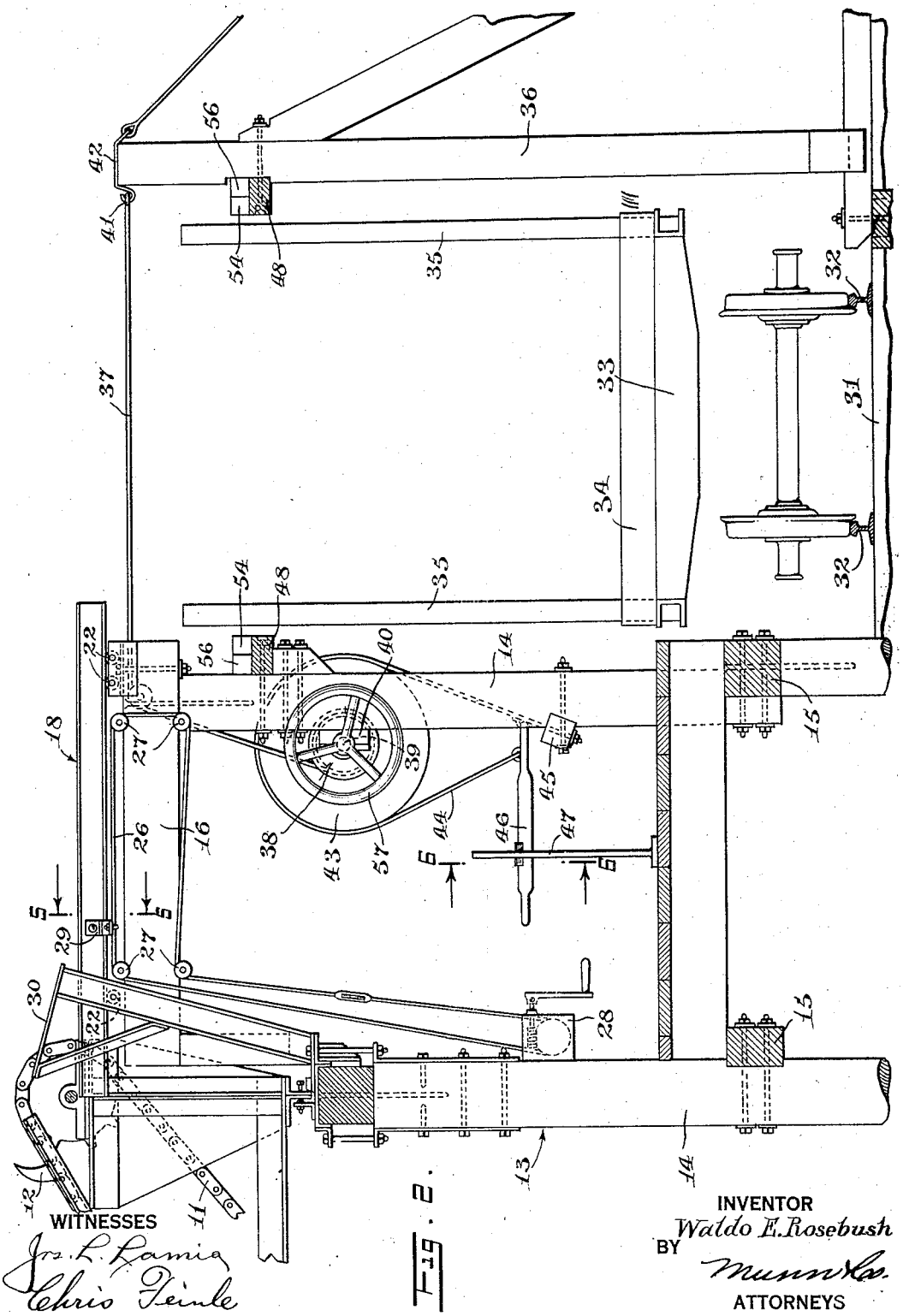

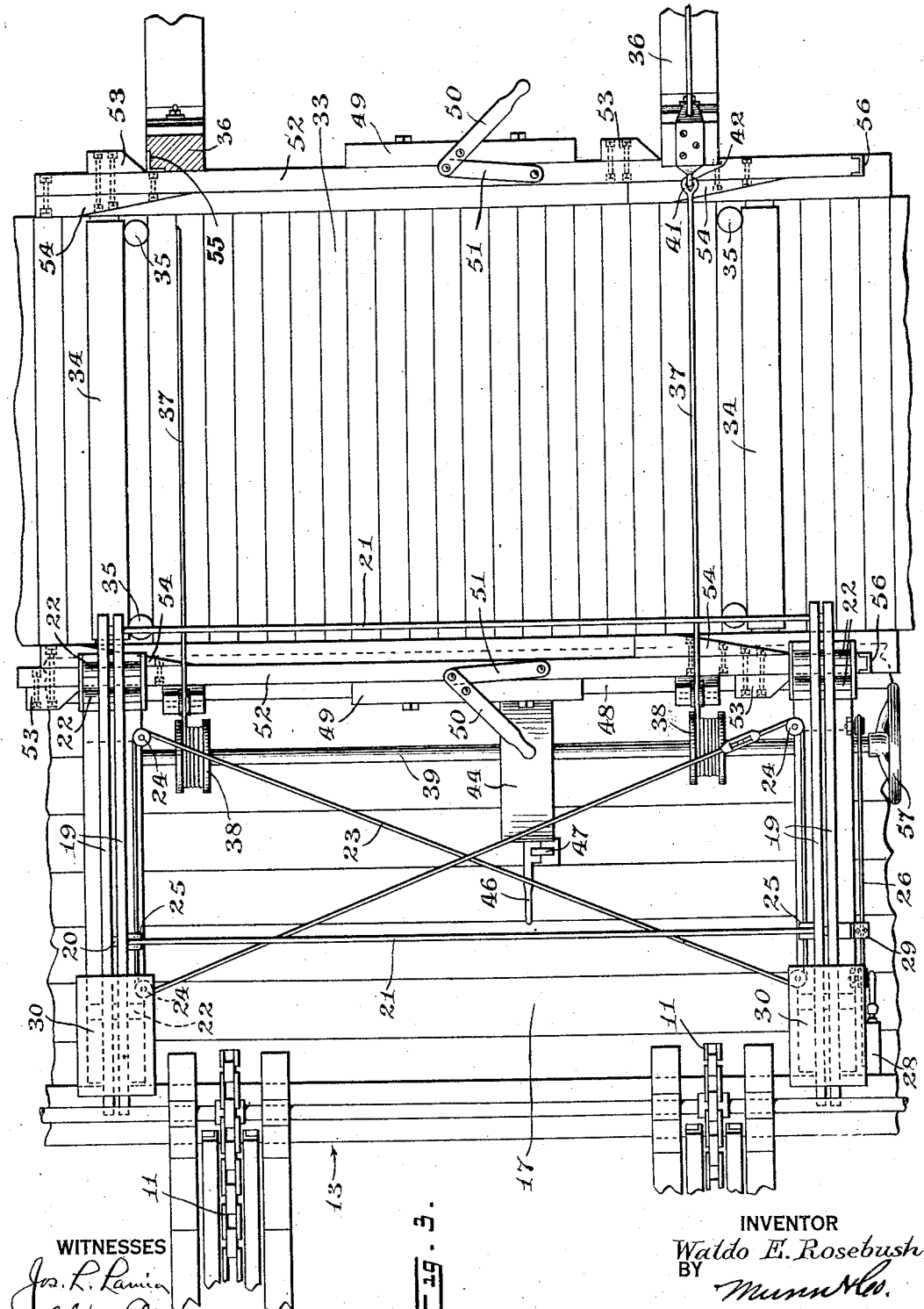

Patented Dec. 6, 1932

1,890,413

UNITED STATES PATENT OFFICE

WALDO E. ROSEBUSH, OF MILLWOOD, WASHINGTON

LOG LOADING APPARATUS

Application filed August 15, 1931. Serial No. 557,360.

This invention relates to an apparatus for conveying logs from a body of water and loading them upon flat cars.

The principal object of the invention is the provision of an apparatus for expeditiously carrying out the work of taking logs out of a body of water, then elevating them, and lowering them on flat cars to load the latter.

The invention resides in the combinations, constructions and operations of the elements and their constituents hereinafter fully described and illustrated in the accompanying drawings, in which Figure 1 is a side elevation of an apparatus embodying the features of the invention;

Figure 2 is an enlarged side elevation of the loading stage and associated elements;

Figure 3 is a plan view of the loading stage and associated elements;

Figure 1:
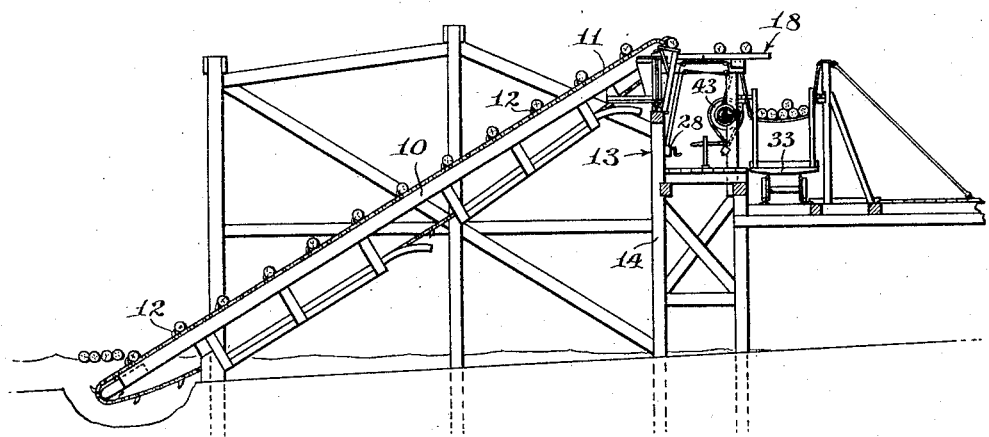
Figure 4:
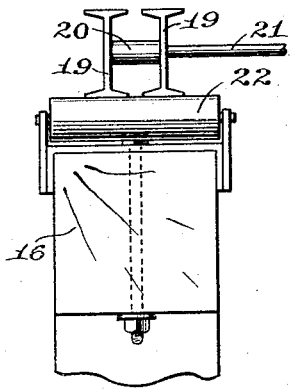
Figure 4 is an end elevation showing one of the details.
Figure 5:
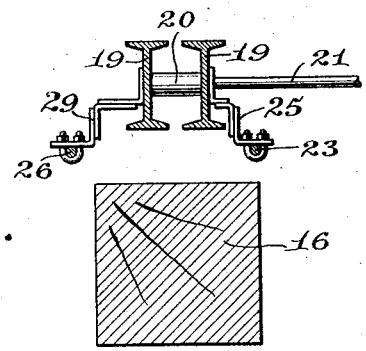
Figure 5 is a detail section on the line 5—5 of Figure 2.
Figure 6:
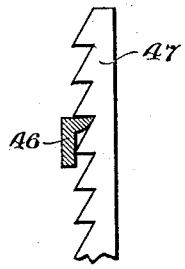
Figure 6 is a detail section on the line 6—6 of Figure 2.

Referring now more particularly to the drawings, it will be apparent that the apparatus of the present invention includes an inclined conveyer 10 which may be of any practical form, designed and adapted to transfer or convey logs from a body of water side by side to a required point of elevation above the body of water with respect to a railroad car track. The conveyer 10 will include endless chains 11 which are properly mounted so as to be driven by a suitable power plant. The chains 11 have flights 12 spaced equidistantly to engage the logs so as to conveniently discharge them at the top of the conveyer side by side. It is to be understood that the logs, which are of standard length of approximately sixteen feet, will be loaded successively on to the conveyer's chains 11 by pike-pole men, who are aided in so doing by a floating dock stationed at a fixed point at the lower or loading end of the conveyer, and against which the logs can be butted, thereby enabling them to be evenly spaced on the conveyer chains for ascent and likewise for discharge at the top of the conveyer.

The apparatus also includes a loading stage generally designated 13. The upper or discharge end of the conveyer 10 is connected with or supported by the stage 13 in operative relation thereto. The loading stage 13 includes a fixed supporting structure comprising piles 14 connected by horizontal timbers 15 and 16 secured to the piles 14. The timbers 15 support a platform 17. The timbers 16 provide a runway for a carriage or traveler 18. The carriage or traveler 18 comprises pairs of I-beams 19 which are connected together by spacers 20 and rods 21. The pairs of I-beams 19 are disposed respectively directly over the timbers 16, and each pair of I-beams travels in contact with rollers 22 mounted on the related timber 16. The said carriage or traveler 18 travels approximately five feet toward and away from the upper or discharge end of the conveyer 10.

In order to cause movement of the carriage or traveler 18 there is provided an endless cable 23 which is crossed and which passes around four sheaves 24 positioned on the timbers 16. The cable 23 is anchored at each side to the related I-beam 19 by a suitable anchoring means 25. A second endless cable 26 vertically disposed passes around four sheaves 27 on one of the timbers 16, and said cable is operatively connected with a hand winch or the like 28 secured to one of the piles 14. The cable 26 is anchored to the adjacent I-beam 19 of the carriage or traveler 18 by a suitable anchoring means 29. It will now be apparent that by operating the winch 28, the carriage or traveler 18 may be moved back and forth through the intervention of the cables 26 and 23 and the anchoring means 25 and 29.

As the logs leave the conveyer 10 they pass on to skids 30 forming part of the loading stage. These skids 30 are fixed in relation to the endless chains 11, respectively, at the outsides thereof, and are disposed directly over the pairs of I-beams 19, as shown most clearly in Figure 3. It will therefore be apparent that as the logs leave the discharge end of the conveyor 10 they will pass onto the skids 30 which will give impetus to the movement of the logs and also guide or direct them onto the carriage or traveler 18 on which the logs may roll.

The loading stage is arranged adjacent a deck 31 on which is laid a railroad track consisting of the rails 32 on which the rolling stock or flat cars to be loaded travel. A flat car is conventionally illustrated and designated 33. Each flat car is usually equipped for loading purposes by the use of what are technically known as "bunks" 34 made of timbers, four of which are used and placed transversely upon the top of the car deck. To these bunks are affixed at the sides or ends projecting downwardly in relation to the car sills, the stakes 35 for holding the logs.

In order to lower the logs on to the deck or platform of the flat car 33 as they are delivered from the carriage or traveler 18, there is provided means presently to be described. Upright brackets 36 are arranged on the deck 31 in spaced relation to each other and also in fixed relation to the rails 32 and fixed structure of the loading stage between the conveyer 10 and said rails 32. Cables or the like 37 are employed and will be arranged at a suitable elevation above the platform or deck of the flat car 33 tranversely thereof. Each cable 37 has one end wound on a drum 38 fast on a shaft 39 journaled for rotation in bearings 40 secured to certain of the piles 14. The opposite or free end of each cable 37 has a hook or loop 41 engageable with a hook 42 secured to the bracket 36 for the particular cable 37. In this manner each cable 37 will be detachably connected with the related bracket 36 at the desired elevation above the deck or platform of the car 33. A friction drum 43 is secured to the shaft 39. A friction band or strap 44 passes around the drum 43 and has one end anchored to an anchor member 45, and its opposite end is connected with a lever 46, the latter coacting with a fixed rack 47. The friction drum and band, together with the lever and rack, constitute means for resisting the load or weight of the logs placed on the cables 37 when they are stretched crosswise of the flat car 33 above the platform thereof. When the cables 37 are connected with the hooks 42, as shown in Figure 2, they will be in positions for lowering the logs on to the platform of the car 33. In the loading operation, one-half of the flat car is properly located in relation to the discharge end of the carriage or traveler 18. The carriage 18 is moved backward and forward so as to enable an operator to place the logs in a more or less even distribution on the flat car. After the first four or five logs are delivered from the carriage 18 on to the cables 37, these cables under the weight of the logs pay out sufficiently so that the logs will be lowered upon the bunks 34. The following logs will drop on to the first four or five logs which have been lowered by the cables 37, and these following logs will have their fall broken by the first few logs. After the required number of logs have been loaded on the first half of the car, the cables 37 are unhooked from the brackets 36 and are then disengaged or are pulled out from beneath the logs on the car. The car is then moved ahead for loading the second half thereof, in which the procedure hereinabove described is repeated.

In loading each car, as the logs pile up, the shock of their falling and the weight combined tend to press outwardly on the stakes 35. In order to counteract this pressure there is provided means on each side of the car track presently to be described. A horizontal sill 48 is supported by certain of the piles 14, and a similar sill 48 is supported by the brackets 36. A member 49 is secured to each sill 48 which supports a lever 50 connected by a link 51 with a beam 52 slidable on the sill 48. The beam has cam blocks 53 on one side thereof and wedges 54 on the opposite side. The blocks 53 cooperate with angle irons 55 on the related piles 14 or brackets 36, as the case may be. It will now be understood that when the lever 50 is operated, the beam 52 will be caused to move endwise, and by reason of the cam blocks 53 acting on the angle irons 55, the beam will be moved sidewise, thereby bringing the wedges into contact with the stakes 35 on the adjacent side of a flat car 33. It is to be understood that the lever 50 when operated to engage the wedges 54 against the stakes 35 will pass the link 51 in such manner as to prevent the wedges being released until the lever is returned to its first position. One end of each beam 52 has an iron cap 56 for hammering the beam back to release the wedges.

Any suitable means, such as a hand wheel or crank 57, may be attached to the shaft 39 for winding the cables 37 on the drums 38 to take them in the desired degree after each lowering operation. The lever 46 may be released so that this may be easily accomplished.

It is to be understood that the invention is not restricted to the precise arrangement of parts shown and described, as details of construction may be modified and rearranged without departing from the spirit of the invention, the scope of which is limited only by the terms of the appended claims.

What is claimed is:—

1. The combination of a runway, a traveler on said runway, said traveler consisting of beams connected together on which material may roll, and lowering means arranged in relation to said traveler to lower material delivered thereto from said traveler.

2. The combination of a runway, a traveler on said runway, said traveler consisting of beams connected together on which material may roll, means to deliver material to said traveler, and lowering means arranged in relation to said traveler to lower material delivered thereto from said traveler.

3. The combination of a wheeled traveler adapted to support logs side by side and on which the logs may roll, a conveyor for elevating the logs to a point above the traveler, and skids arranged in relation to the traveler and conveyor to guide the logs from the conveyor onto the traveler.

4. The combination of a runway, a traveler on said runway, said traveler consisting of beams connected together on which material may roll, lowering means arranged in relation to said traveler to lower material delivered thereto from said traveler, and means to operate the traveler.

5. The combination with a conveyor adapted to elevate logs from a body of water, of a railroad car track, means arranged in relation to the track for lowering logs onto a car on said track, a structure in fixed relation to the conveyor and said lowering means between the same, and a traveler movable on said structure for transferring logs from the conveyor for delivery onto said lowering means.

6. The combination with a conveyor adapted to elevate logs from a body of water, of a fixed frame structure, lowering means for lowering the logs, a traveler movable on said frame structure in relation to said conveyor and lowering means to transfer logs from the conveyor for delivery onto said lowering means, and means to operate said traveler.

7. The combination with a conveyor adapted to elevate logs, a runway arranged in advance of the conveyor below the discharge end thereof, a traveler on said runway, said traveler being of such construction that the logs may roll thereon, and means arranged in relation to said discharge end of the conveyor to give impetus to the movement of the logs and to guide them from the conveyor onto the traveler.

8. The combination with a conveyor adapted to elevate logs, a runway arranged in advance of the conveyor below the discharge end thereof, a traveler on said runway, said traveler being of such construction that the logs may roll thereon, means arranged in relation to said discharge end of the conveyor to give impetus to the movement of the logs and to guide them from the conveyor onto the traveler, and means to operate the traveler.

WALDO E. ROSEBUSH.